US009435905B2

(12) United States Patent
Wang et al.

(10) Patent No.: US 9,435,905 B2
(45) Date of Patent: Sep. 6, 2016

(54) PREMIGRATION DEGHOSTING OF SEISMIC DATA WITH A BOOTSTRAP TECHNIQUE

(71) Applicant: CGGVERITAS SERVICES SA, Massy (FR)

(72) Inventors: Ping Wang, Sugar Land, TX (US); Can Peng, Houston, TX (US)

(73) Assignee: CGG SERVICES SA, Massy (FR)

( * ) Notice: Subject to any disclaimer, the term of this patent is extended or adjusted under 35 U.S.C. 154(b) by 743 days.

(21) Appl. No.: 13/845,819

(22) Filed: Mar. 18, 2013

(65) Prior Publication Data
US 2013/0282292 A1  Oct. 24, 2013

Related U.S. Application Data

(60) Provisional application No. 61/635,385, filed on Apr. 19, 2012.

(51) Int. Cl.
*G01V 1/00* (2006.01)
*G01V 1/36* (2006.01)
*G01V 1/38* (2006.01)

(52) U.S. Cl.
CPC *G01V 1/364* (2013.01); *G01V 1/38* (2013.01)

(58) Field of Classification Search
CPC .................................................. G01V 1/364
USPC ........................................................ 702/17
See application file for complete search history.

(56) References Cited

U.S. PATENT DOCUMENTS

| 8,833,509 B2* | 9/2014 | Meier | G01V 1/04 181/111 |
| 2010/0054080 A1* | 3/2010 | Cambois | G01V 1/38 367/24 |
| 2011/0134718 A1* | 6/2011 | van Borselen | G01V 1/364 367/24 |
| 2011/0305109 A1* | 12/2011 | Soubaras | G01V 1/28 367/24 |
| 2013/0163376 A1* | 6/2013 | Poole | G01V 1/28 367/24 |

FOREIGN PATENT DOCUMENTS

EP    2330443 A2    6/2011

OTHER PUBLICATIONS

UK Search Report dated Oct. 21, 2013, in related British Application GB1307110.5.
David Carlson et al., "Increased Resolution and Penetration from a Towed Dual-Sensor Streamer", First Break, Dec. 2007, pp. 71-77, vol. 25, EAGE.
Bruno Gratacos, "Over-Under Deghosting: 1D, 2D or 3D Algorithms in the F, FK or FXY Domains", pp. 125-129, SEG Las Vegas, Nov. 9-14, 2008 Annual Meeting.
A. Kemal Ozdemir, et al., "Optimized Deghosting of Over/Under Towed-Streamer Data in the Presence of Noise", The Leading Edge, Feb. 27, 2008, pp. 190-199.
Robert Soubaras, "Deghosting by Joint Deconvolution of a Migration and a Mirror Migration", CGGVeritas, 2010.
Office Action and Search Report in corresponding Singapore Application No. 2013028816 dated Dec. 11, 2014.

* cited by examiner

Primary Examiner — Tung S Lau
Assistant Examiner — Xiuquin Sun
(74) Attorney, Agent, or Firm — Patent Portfolio Builders PLLC

(57) ABSTRACT

Methods and systems for optimized receiver-based ghost filter generation are described. The optimized ghost filter self-determines its parameters based on an iterative calculation of recorded data transformed from a time-space domain to a Tau-P domain. An initial ghost filter prediction is made based on generating mirror data from the recorded data and using a least squares technique during a premigration stage.

18 Claims, 13 Drawing Sheets

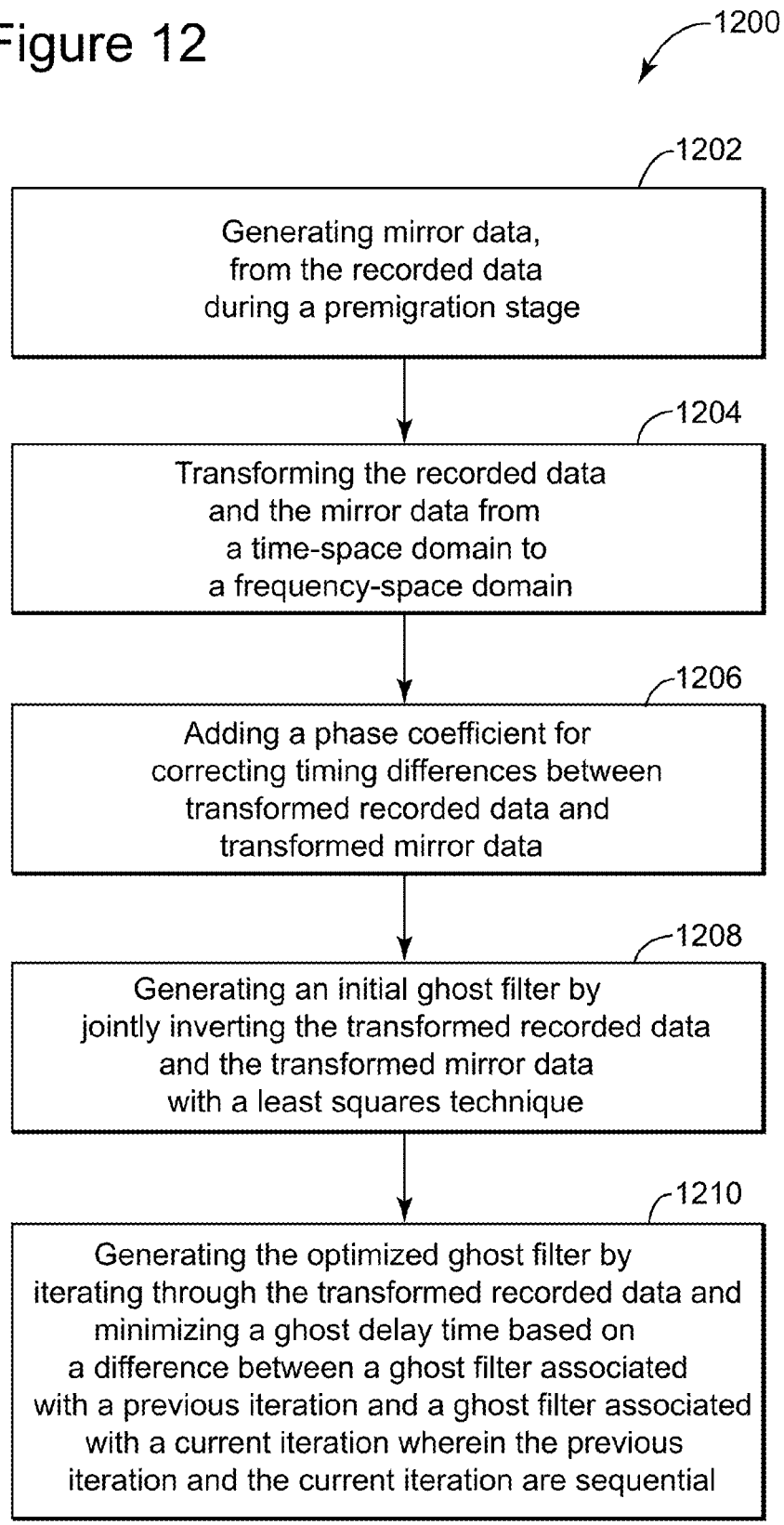

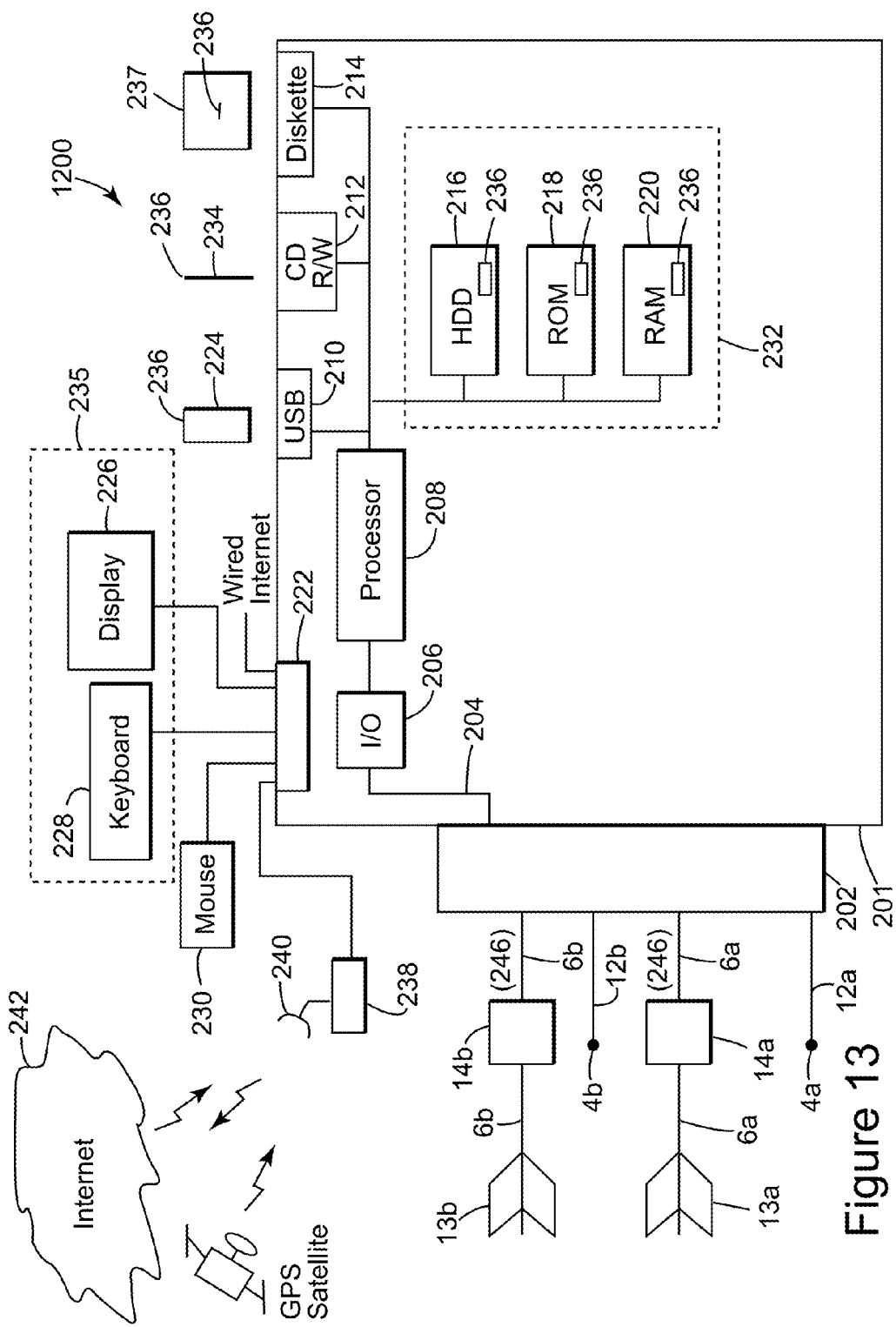

PREMIGRATION DEGHOSTING OF SEISMIC DATA WITH A BOOTSTRAP TECHNIQUE

RELATED APPLICATION

The present application is related to, and claims priority from U.S. Provisional Patent Application No. 61/635,385, filed Apr. 19, 2012, entitled "Premigration Deghosting for Marine Towed Streamer Data Using a Bootstrap Approach", to Ping Wang and Can Ping, the disclosure of which is incorporated herein by reference.

TECHNICAL FIELD

Embodiments of the subject matter disclosed herein generally relate to methods and systems for seismic data processing and, more particularly, to mechanisms and techniques for generating optimized receiver-based ghost filters.

BACKGROUND

Seismic data acquisition and processing techniques are used to generate a profile (image) of a geophysical structure (subsurface) of the strata underlying the and surface or seafloor. Among other things, seismic data acquisition involves the generation of acoustic waves and the collection of reflected/refracted versions of those acoustic waves to generate the image. This image does not necessarily provide an accurate location for oil and gas reservoirs, but it may suggest, to those trained in the field, the presence or absence of oil and/or gas reservoirs. Thus, providing an improved image of the subsurface in a shorter period of time is an ongoing process in the field of seismic surveying.

A significant problem in marine-based seismic data analysis is receiver ghosts. In marine-based seismic data acquisition, the up-going acoustic waves reflected from subsurface reflectors are first recorded by the receivers. Next, the acoustic waves continue to propagate to the surface where they are reflected back down and are recorded again by the receivers as ghosts. The reflectivity at the free surface is close to negative one and based on this property, the down-going acoustic waves have similar amplitudes as the previously described up-going acoustic waves but have an opposite polarity. Accordingly, some of the frequencies in the recorded acoustic wave data are attenuated near the ghost notches and the removal of the receiver ghosts can provide the benefit of infilling the ghost notches and providing higher quality images in terms of frequency band and signal-to-noise ratio.

Removing receiver ghost before data migration has proven advantageous because it provides better low frequency and high frequency response as well as a higher signal-to-noise ratio for preprocessing steps, e.g., multiple suppression and velocity analysis. In one attempt to remove receiver ghosts, associated with receivers maintained at a constant depth, the ghost removal has been carried out in the frequency/wavenumber (FK) domain but limitations such as requiring a constant depth for the receivers and limiting the seismic data collection to two dimensions because of the coarse sampling in the crossline direction for the high frequencies in the seismic data have provided unsuitable results. For an example, please refer to J. T. Fokkema and P. M. van den Berg in their 1993 article entitled "Seismic Applications of Acoustic Reciprocity" published by Elsevier and incorporated herein by reference.

In another attempt to remove receiver ghosts associated with non-horizontal receiver based seismic data, a method was presented by C. D. Riyanti, R. G. Van Borselen, P, M. van den Berg and J. T. Fokkema in their 2008 article entitled "Pressure Wavefield Deghosting for Non-horizontal Streamers," published in the 78th Meeting, SEG, Expanded Abstracts, pages 2652-2656 and incorporated herein by reference. The presented method was capable of handling variable-depth receivers as long as their depths were accurately known, but as above, could handle only two-dimensional data because the method worked in the FK domain.

A further attempt to remove receiver ghosts includes a method using both pressure wavefields and velocity wavefields to attenuate the receiver ghosts. In this method the particle velocity is measured in the vertical direction of the wave propagation. In essence, the upward moving waves detected by the geophones and hydrophones are in phase and the downward moving reflections, i.e., the receiver ghosts, are one hundred eighty degrees out of phase so that summing the two recorded datasets can attenuate the receiver ghost. Unfortunately, difficulties arise in calibrating the difference between the two datasets because of low signal-to-noise ratio for particle velocity data and emergence-angle variations. This method is described in more detail in a 2007 article by D. A. Carlson, W. Long, H. Tobti, R. Tenghamn and N. Lunde entitled "Increased resolution and Penetration from a Towed Dual-Sensor Streamer," published in First Break, 25, pages 71-77 and incorporated herein by reference.

Other attempts have been made to remove receiver ghosts, for example, the interested reader is referred to B. J. Postumus who authored a 1993 article entitled "Deghosting Using a Twin Streamer Configuration," published in Geophysical Prospecting, 41, pages 267-286 for concurrently towed shallow and deep streamers, and enhancements to this method by A. K. Özdemir, P. Caprioli, A. Özbek, E. Kragh and J. Robertsson for their 2008 article entitled "Optimized Deghosting of Over/Under Towed-Streamer Data in the Presence of Noise," published in The Leading Edge, 27, page 90 for an optimal deghosting approach in the FK domain to jointly deghost the shallow depth data and the deep depth data and by B. Gratacos for the 2008 article entitled "Over/Under Deghosting: 1D, 2D or 3D Algorithms in the F, FK or FXY Domains," published in the 78th Meeting, SEG, Expanded Abstracts, pages 125-129 to obtain an upward direction wavefield. Unfortunately, this method and its enhancements suffer collectively from sparse crossline sampling and require accurate receiver positioning, not easily accomplished, for high frequencies.

Accordingly, it would be desirable to provide systems and methods that avoid the afore-described problems and drawbacks, and which generate improved fold (illumination) maps.

SUMMARY

According to an exemplary embodiment, a method, stored in a memory and executing on a processor, for generating an optimized receiver-based ghost filter from recorded data comprises generating mirror data, from the recorded data, during a premigration stage; transforming the recorded data and the mirror data from a time-space domain to a frequency-space domain; adding a phase coefficient for correcting timing differences between transformed recorded data and transformed mirror data; generating an initial ghost filter by jointly inverting the transformed recorded data and the transformed mirror data with a least squares technique;

and generating the optimized ghost filter by iterating through the transformed recorded data and minimizing a ghost delay time based on a difference between a ghost filter associated with a previous iteration and a ghost filter associated with a current iteration wherein the previous iteration and the current iteration are sequential.

According to another exemplary embodiment, a node for generating ghost-free receiver-based seismic data comprises recorded seismic data; one or more processors configured to execute computer instructions and a memory configured to store the computer instructions wherein the computer instructions further comprises a mirror data component for generating mirror data of the recorded data; an engine component for transforming the recorded data and the mirror data from a space-time domain to a frequency-time domain and for adding a phase coefficient to correct for time differences between transformed recorded data and transformed mirror data; a ghost filter component for generating an optimized ghost filter based on predicting an initial ghost filter and optimizing the initial ghost filter based on minimizing a ghost filter delay time associated with the transformed recorded data; and an output component for applying the optimized ghost filter to the transformed recorded data and outputting the ghost-free receiver-based seismic data.

BRIEF DESCRIPTION OF THE DRAWINGS

The accompanying drawings, which are incorporated in and constitute a part of the specification, illustrate one or more embodiments and, together with the description, explain these embodiments. In the drawings:

FIG. 12 is a flowchart depicting a method of optimized receiver-based ghost filter generation according to another embodiment; and FIG. 13 illustrates an exemplary data processing device or system which can be used to implement the embodiments.

DETAILED DESCRIPTION

The following description of the exemplary embodiments refers to the accompanying drawings. The same reference numbers in different drawings identify the same or similar elements. The following detailed description does not limit the invention. Instead, the scope of the invention is defined by the appended claims. Some of the following embodiments are discussed, for simplicity, with regard to the terminology and structure of generating seismic illumination data ghost filters and generating maps of seismic illumination during marine acquisition. However, the embodiments to be discussed next are not limited to these configurations, but may be extended to other arrangements as discussed later.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

According to various embodiments described herein, methods and systems for generating (computing) seismic illumination data ghost filters are presented which, for example, self-determine their parameters for receiver deghosting associated with a seismic data analysis. Such methods and systems can, for example, be used in the pre-migration stage of a seismic data analysis and are applicable to a seismic data collection system which has receivers located at various depths without incurring the problems and/or limitations associated with the prior attempts.

Figure 1:
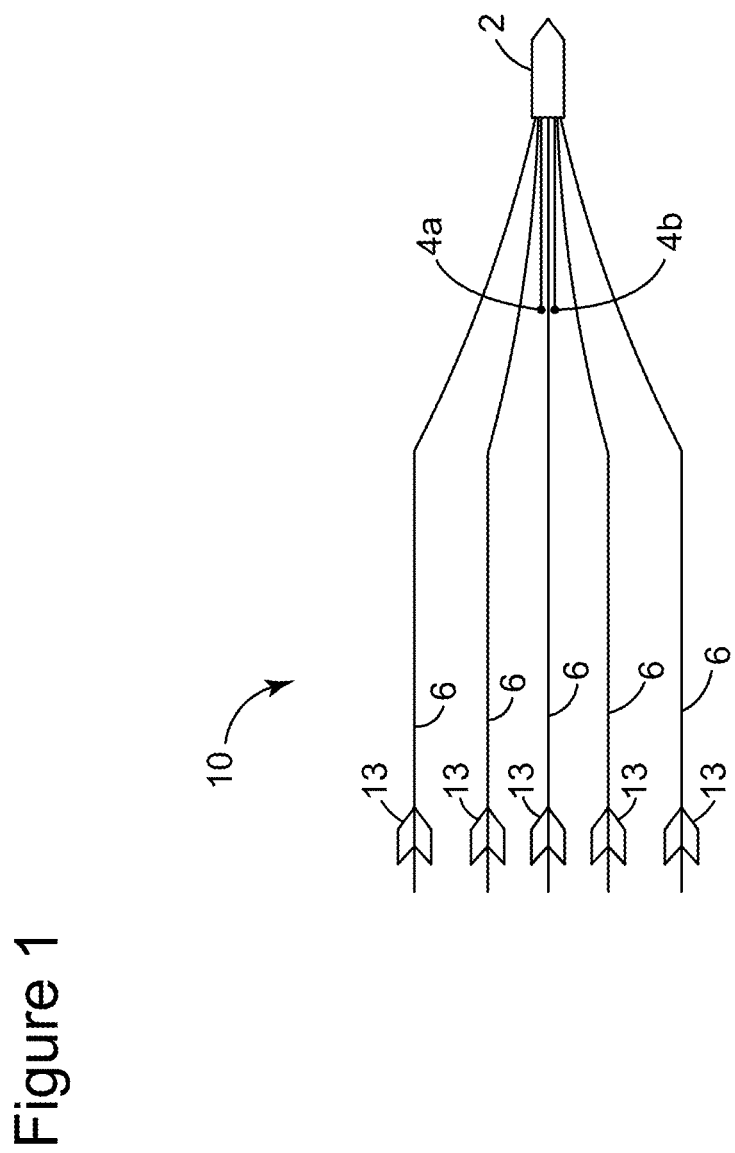
FIGS. 1 and 2 show various aspects of an exemplary marine seismic survey system in which various optimized receiver based ghost filter generation embodiments can be implemented.

In order to provide some context for the subsequent exemplary embodiments related to the collection of seismic data, the removal of receiver ghosts and the generation of seismic illumination maps, consider first a seismic data acquisition process and system as will now be described with respect to FIGS. 1 and 2. In FIG. 1, a data acquisition system 10 includes a ship 2 towing plural streamers 6 that may extend over kilometers behind ship 2. Each of the streamers 6 can include one or more birds 13 that maintains streamer 6 in a known fixed position relative to other streamers 6, and the birds 13 are capable of moving streamer 6 as desired according to bi-directional communications birds 13 can receive from ship 2. One or more source arrays 4*a,b* may be also towed by ship 2 or another ship for generating seismic waves. Source arrays 4*a,b* can be placed either in front of or behind receivers 14, or both behind and in front of receivers 14. The seismic waves generated by source arrays 4*a,b* propagate downward, reflect off of, and penetrate the seafloor, wherein the refracted waves eventually are reflected by one or more reflecting structures (not shown in FIG. 1) back to the surface (see FIG. 2, discussed below). The reflected seismic waves propagate upwardly and are detected by receivers 14 provided on streamers 6. The seismic waves then reflect off of the free surface, i.e., the surface of the body of water (see FIG. 2, discussed below), traveling downward and are once again detected by receivers 14 provided on streamers 6 as receiver ghosts. This process is generally referred to as "shooting" a particular seafloor area, with the seafloor area referred to as a "cell" and the sea surface referred to as a "free surface."

Figure 2:
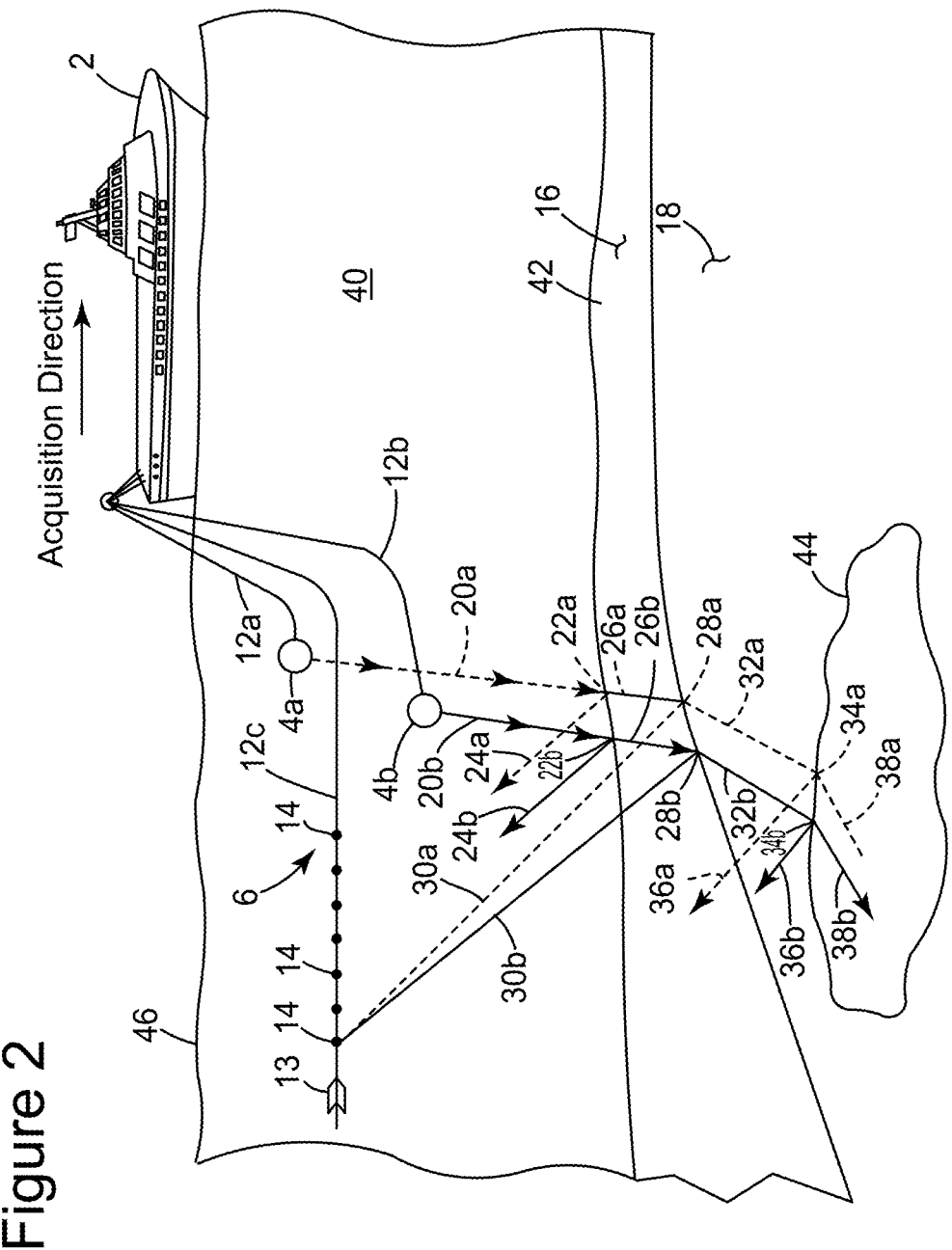

FIG. 2 illustrates a side view of the data acquisition system 10 of FIG. 1. Ship 2, located on ocean surface 46, tows one or more streamers 6, that is comprised of cables 12, and a plurality of receivers 14. Shown in FIG. 2 are two source streamers, which include sources 4*a,b* attached to respective cables 12*a,b*. Each source 4*a,b* is capable of transmitting a respective sound wave, or transmitted signal 20*a,b*. For the sake of simplifying the drawings, but while not detracting at all from an understanding of the many principles involved, only a first transmitted signal 20*a* will be shown (even though some or all of sources 4 can be simultaneously (or not) transmitting similar transmitted signals 20). First transmitted signal 20a travels through ocean 40 and arrives at first refract on/reflection point 22a. First reflected signal 24a from first transmitted signal 20a travels upward from ocean floor 42, back to receivers 14. As those of skill in the art can appreciate, whenever a signal—optical or acoustical—travels from one medium with a first index of refraction n1 and meets with a different medium, with a second index of refraction $n_2$, a portion of the transmitted signal is reflected at an angle equal to the incident angle (according to the well-known Snell's law), and a second portion of the transmitted signal can be refracted (again according to Snell's law).

Thus, as shown in FIG. 2, first transmitted signal 20a generates first reflected signal 24a, and first refracted signal 26a. First refracted signal 26a travels through sediment layer 16 (which can be generically referred to as first subsurface layer 16) beneath ocean floor 42, and can now be considered to be a "new" transmitted signal, such that when it encounters a second medium at second refraction/reflection point 28a, a second set of refracted and reflected signals 32a and 30a, are subsequently generated. Further, as shown in FIG. 2, there happens to be a significant hydrocarbon deposit 44 within a third medium, or solid earth/rock layer 18 (which can be generically referred to as second subsurface layer 18). Consequently, refracted and reflected signals are generated by the hydrocarbon deposit, and it is the purpose of data acquisition system 10 to generate data that can be used to discover such hydrocarbon deposits 44.

The signals recorded by seismic receivers 14 vary in time, having energy peaks that may correspond to reflectors between layers. In reality, since the sea floor and the air/water are highly reflective, some of the peaks correspond to multiple reflections or spurious reflections that should be eliminated before the geophysical structure can be correctly imaged. Primary waves suffer only one reflection from an interface between layers of the subsurface (e.g., first reflected signal 24a). Waves other than primary waves are known as multiples. A surface multiple signal is one such example of a multiple, however there are other ways for multiples to be generated. For example, reflections form the surface can travel back down to the receivers and be recorded as ghosts. Multiples do not add any useful information about the geology beneath the ocean floor, and thus they are, in essence, noise, and it is desirable to eliminate them and/or substantially reduce and/or eliminate their influence in signal processing of the other reflected signals so as to correctly ascertain the presence (or the absence) of underground/underwater hydrocarbon deposits. Similarly ghosts, i.e., reflections of primary waves or multiples from the surface of the water which are again recorded by receivers 14, should also be suppressed or removed.

Figure 3:
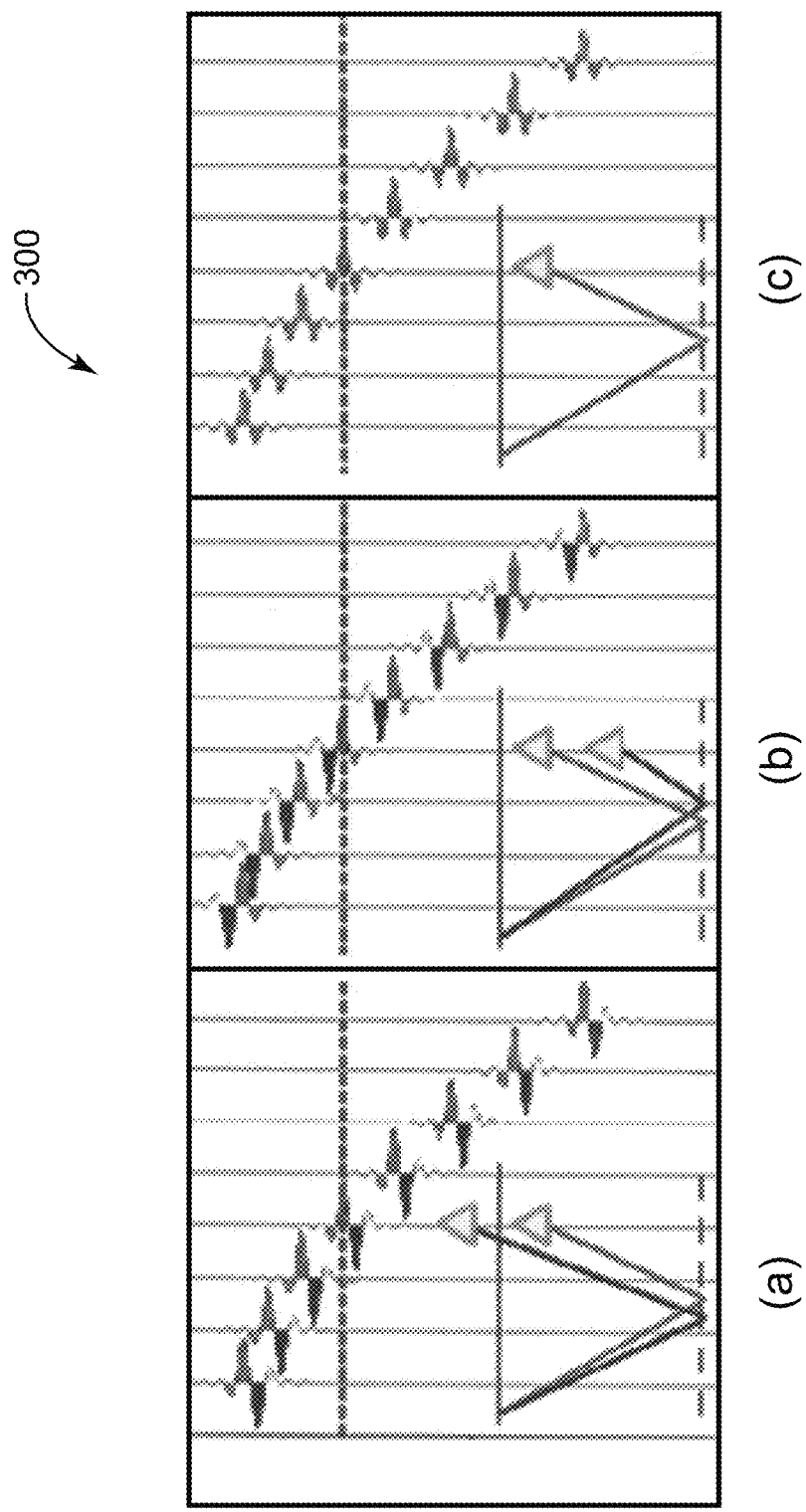
FIG. 3 shows various aspects of recorded, mirror and deghosted data.

The data collected and recorded by receivers 14 of FIG. 2 can be processed to, among other things, remove receiver ghosts and generate the types of illumination maps described above. This involves, among other things, in the frequency-space domain, the use of recorded data (FIG. 3a) and mirror data (3b), created from the recorded data, to jointly invert and create receiver ghost-free data (FIG. 3c). In a first aspect, mirror data is created from the recorded data. The creation of mirror data from recorded data can be accomplished by a mechanism such as, but not limited to, a one-dimensional ray-tracing based normal moveout correction technique. This technique approximately, redatums the receiver ghost in the recorded data to the primary timing. It should be noted therefore that the primary in the recorded data becomes the mirror ghost which arrives earlier than the primary.

In a given time-space window, the recorded data n(t, x, y) and the mirror data m(t, x, y) are transformed from the time-space domain to a frequency-space domain. The transformed recorded data N(f, x, y) and mirror data M(f, x, y) can now be expressed by multiplying the Primary receiver ghost-free data (P) with a receiver ghost filter $F_N$ and a mirror ghost filter $F_M$ to produce:

$$N=F_N P \text{ and } M=F_M P. \tag{1}$$

In theory, the receiver ghost filter $F_N$ equals the mirror ghost filter $F_M$, i.e., $$F_N=F_M, \tag{2}$$

because they are aligned in timing, but this manipulation of the recorded data to produce the mirror data will, in reality, result in a time shift based on factors such as, but not limited to, redatuming using the one-dimensional approximation, velocity inaccuracy and receiver depth error. Accordingly, a phase coefficient to match the timing displacement is added, producing:

$$F_M=e^{i\omega\phi}F_N. \tag{3}$$

Continuing, combining equation 1 and equation 3 creates a system which can be solved using a least squares process to generate an initial value for a ghost filter for the recorded data. Next, the initial ghost filter value can be recalculated through an iterative process to create an optimized ghost filter for the recorded data.

Looking now to the iterative process, and using the initial ghost filter as a starting point, the ghost can be obtained from the equation:

$$G_i=N-P_i. \tag{4}$$

Next, the optimal average ghost-delay time Ti for a given iteration window can be obtained by minimizing the absolute value of the equation:

$$Pi+Gie^{i\omega Ti} \tag{5}$$

resulting in an expression of the optimal ghost filter of:

$$F_{i+1}=1-e^{-i\omega Ti} \tag{6}$$

The primary can then be derived as:

$$P_{i+1}=N/F_{i+1} \tag{7}$$

where $F_{i+1}$ is self-determined, i.e., bootstrapped, from the $i_{th}$, i.e., the previous iteration. It should be noted that once an optimal ghost filter is determined, the mirror data is not required by equation 7 for producing the deghosted recorded data. It should further be noted that this method works in a localized time-space domain window in which all events have a similar ghost-delay time. A similar ghost-delay time can be defined as less than the inverse of the quantity four times the maximum frequency of the data.

To illustrate the benefits of ghost removal using a ghost filter as described above, the algorithm is first applied to synthetic data modeled from 2.5D Sigsbee2a model using a constant receiver depth of 25 feet. To demonstrate that the method does not depend on accurate receiver depth, random error is intentionally added, with a standard deviation of two feet, to the true receiver depths when generating the mirror data for the results shown in this example.

Figure 4:
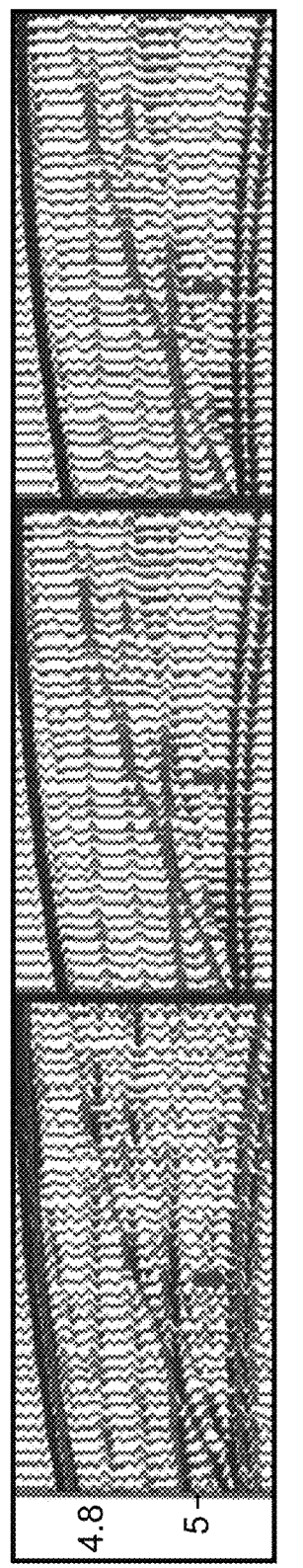
FIG. 4 shows various aspects of time shifted recorded, mirror and deghosted data.

Looking now to FIG. 4, FIG. 4a is an input shot gather with the receiver ghost. Every individual event consists of a black peak and a red trough, with peak after trough or vice versa depending on the polarity of the event. The data in FIG. 4b is after receiver deghosting, hereafter called deghosted data. The ghost data, i.e., the difference between deghosted data and input data, is shown in FIG. 4c. The difference can be seen that after receiver deghosting, two black events around 5.1 seconds (4*b*, 4*c*) are well-separated when they were otherwise overlapping with each other prior to receiver deghosting (4*a*). This is a direct indication of resolution enhancement due to receiver deghosting. Another observation is that the ghost data are very similar to the deghosted data except for a time delay of ~10 milliseconds which corresponds to a receiver depth of twenty-five feet. This proves that the receiver deghosting works properly, even when the receiver depth error is present and events interfere with each other.

Figure 5:
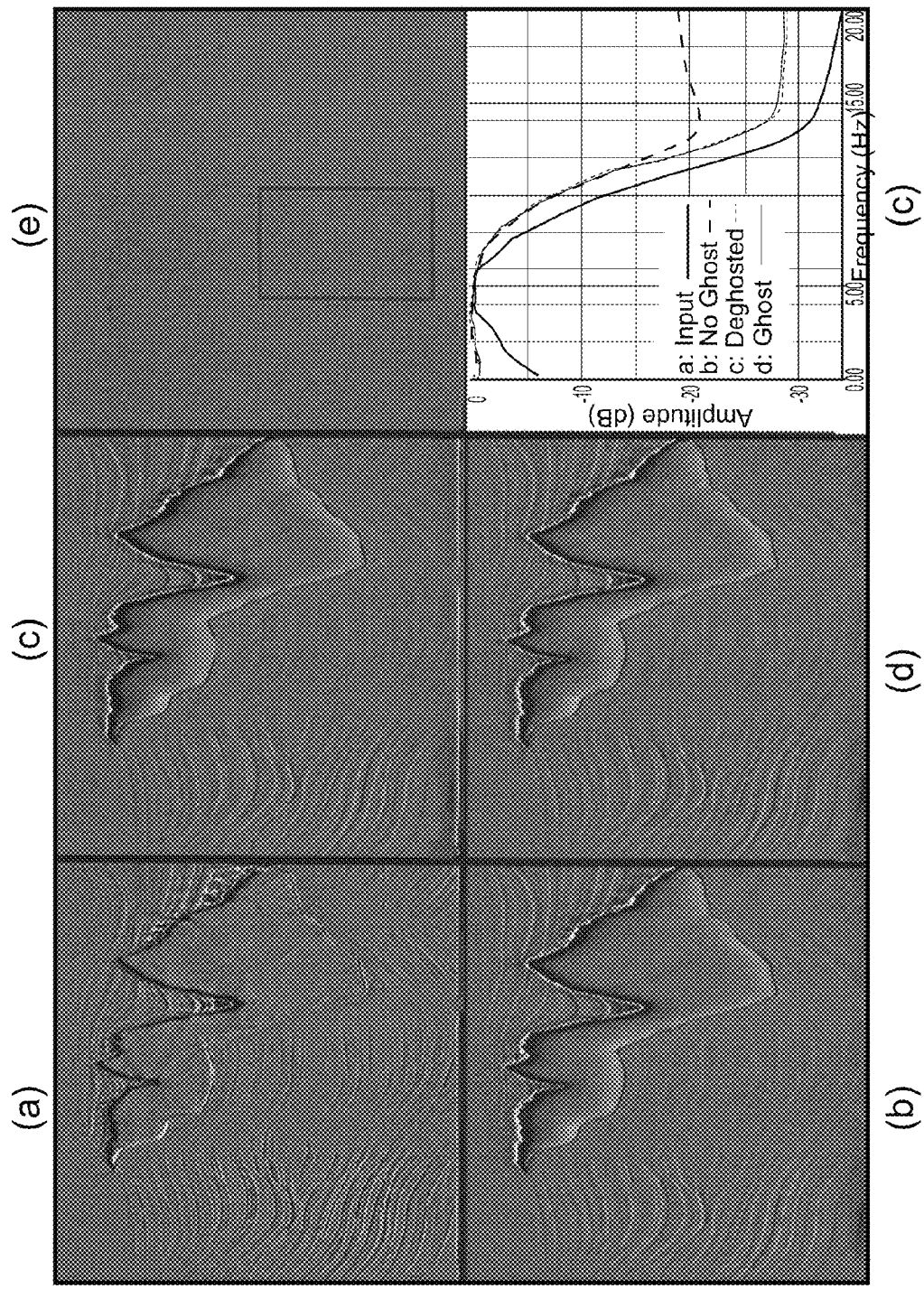
FIG. 5 shows various aspects of stacked reverse time migration for recorded, mirror and deghosted data.

Looking now to FIG. 5, the images shown in FIG. 5*a-e* are stacked 3D® images (the receivers were positioned at negative receiver depth when migrating the ghost data). The images for modeled data with and without receiver ghost are shown in FIG. 5*a* and FIG. 5*b*. The images for deghosted data and ghost data are shown in FIG. 5*c* and FIG. 5*d*. It can be seen that, compared to the image with receiver ghost (FIG. 5*a*), the images in FIGS. 5*b*-5*d* appear to have a broader frequency spectrum which is consistent with the depth-domain spectrum comparison in FIG. 5*f*. The small difference (FIG. 5*e*) between FIG. 5*c* and FIG. 5*d* and their high similarity to FIG. 5*b* mean that the primary and receiver ghost in the input data are accurately separated by the exemplary embodiment deghosting algorithm.

Figure 6:
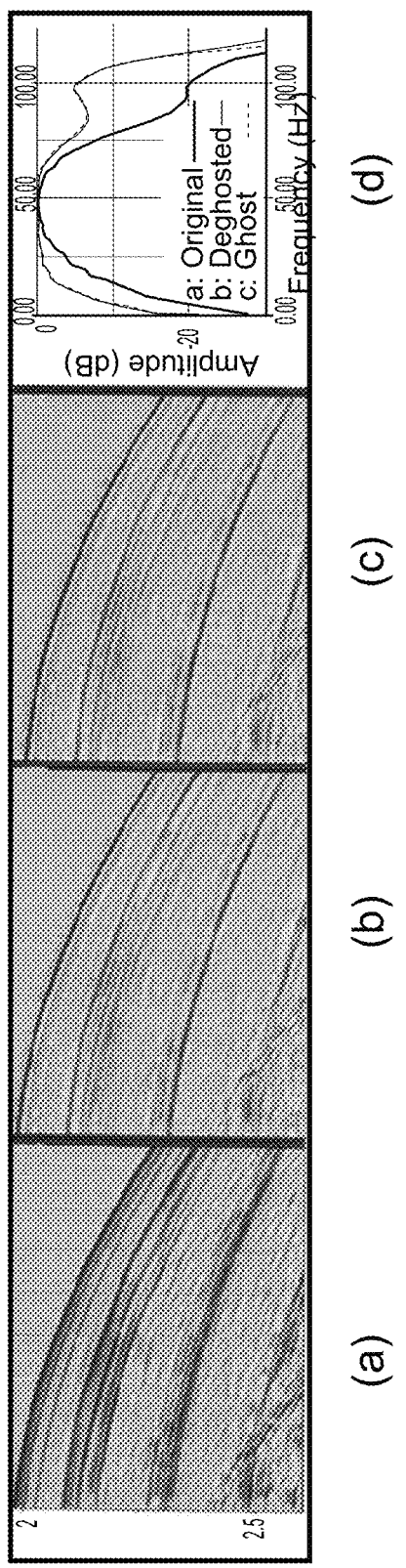
FIG. 6 shows various aspects of an outer cable gather for recorded, mirror and deghosted data.

In this example the exemplary bootstrap deghosting method is applied to a three dimensional data set from the Diana field in the East Breaks area of the Gulf of Mexico. The data set has constant shot and steamer depths at seven meters and nine meters respectively. Looking to FIG. 6, included is the input shot gather (FIG. 6*a*), deghosted gather (FIG. 6*b*), and ghost gather (FIG. 6*c*) from an outer cable. The near-channel data from the outer cable are generally expected to carry strong three-dimensional effects. However, the high similarity between deghosted gather (FIG. 6*b*) and ghost gather (FIG. 6*c*) indicates that our receiver deghosting works well in the presence of three-dimensional effects. FIG. 6*d* shows that the spectra of deghosted and ghost data are almost identical and are broader than that of the original data.

Figure 7:
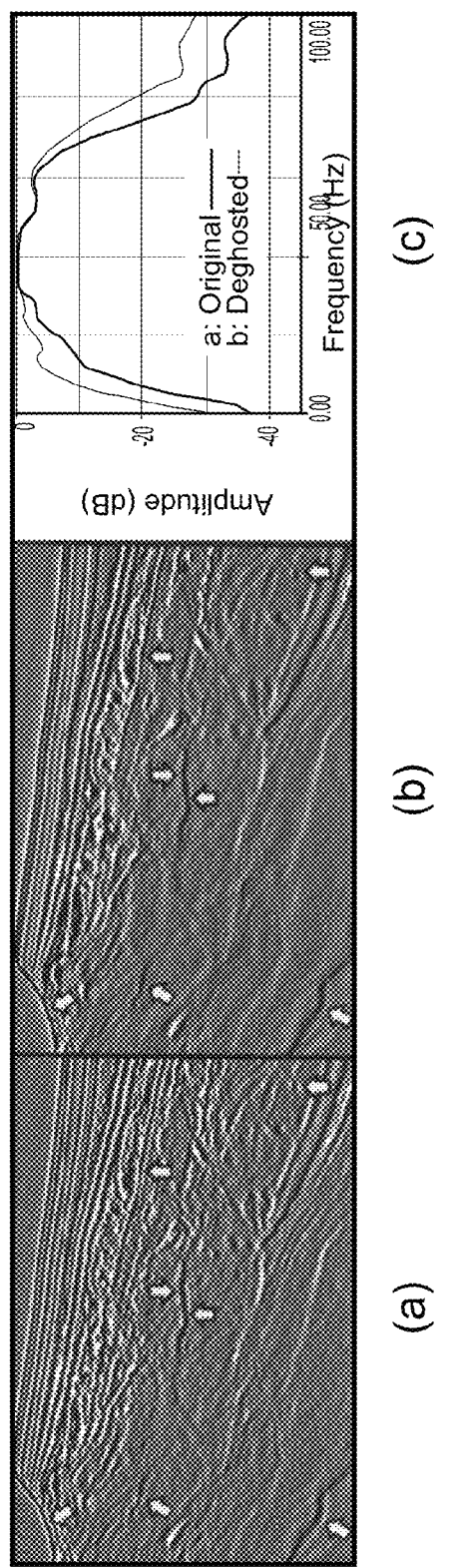
FIG. 7 shows various aspects of stacked 3D PSDM images for recorded and deghosted data.
Figure 8:
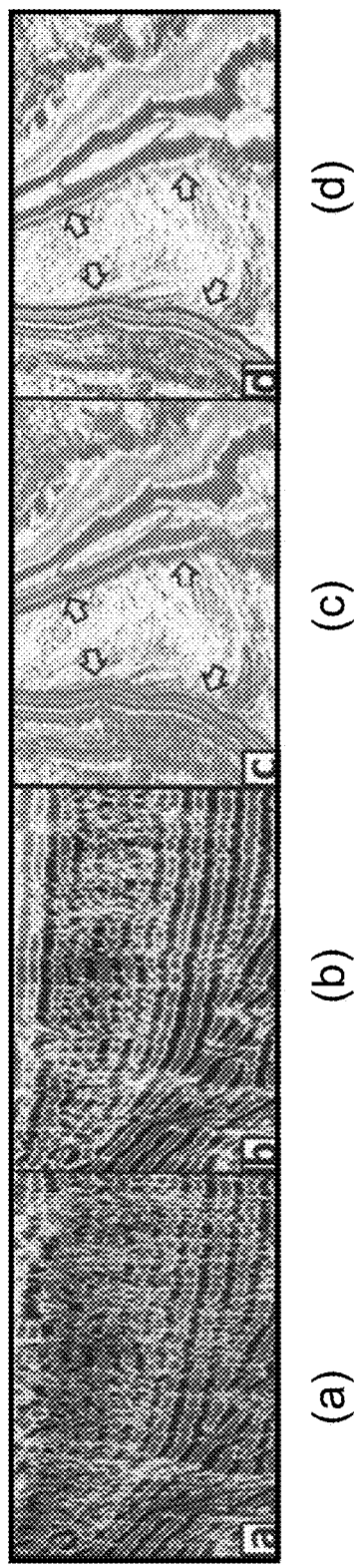
FIG. 8 shows various aspects of 0-5 Hz images and 1600 meter depth slices for recorded and deghosted data.

Looking now to FIG. 7, the image shown in FIG. 7*a* is the stacked three-dimensional Kirchhoff prestack depth migration (PSDM) image of the input data without receiver deghosting and the image in FIG. 7*b* is the image after receiver deghosting. It is readily apparent that after receiver deghosting the wavelet appears more tightened which is an indication of broader frequency band. The spectrum comparison in FIG. 7*c* confirms that the receiver deghosting helps obtain images with broader frequency spectrum. FIGS. 8*a*-8*b* show the 0-5 Hz images before and after receiver deghosting. The events can be better seen with less noise after receiver deghosting. The depth slice at 1600 meters, after receiver deghosting (FIG. 8*d*), looks sharper with weaker side-lobes and thus the events are better delineated when compared to this same depth slice before deghosting (FIG. 8*c*).

Presented above is a self-sustaining, or bootstrap, deghosting method that can effectively remove the receiver ghost in data from a variety of marine towed streamer configurations. The advantages of the exemplary method include, but are not limited to, 1) no requirement for dense sampling in either the inline or crossline direction; and 2) no requirements for accurately-known receiver depths. Based on receiver deghosting, the migrated images have better low and high frequency response, as well as improved signal-to-noise ratio, which is beneficial for the interpretation of geological structures and rock properties. Although the exemplary method uses two datasets, recorded data and mirror data, the method creates the mirror data from recorded data, making the data cheaper to acquire. Additionally, the exemplary method does not require normalization between the two datasets prior to deghosting because both datasets are recorded by the same sensor.

The exemplary method is also applicable to marine towed streamer data of most (if not all) acquisition methods, including variable-depth streamer methods. The exemplary bootstrap approach uses a velocity model to create mirror data (FIG. 3*b*), but it should be noted that the exemplary method is not sensitive to the inaccuracy of that velocity model (Equation 3). In addition, the mirror data are not used for the final deghosting (Equation 7).

The exemplary method operates on events in a chosen T-XY window which bears similar ghost-delay time but in practice a time window of 200-600 milliseconds is often used, depending on the frequency content and sampling rate of input data. The space window of the exemplary method can be fairly small but a larger space window, i.e., approximately 10-30 traces per window, is used to stabilize the inversion when strong noise is present.

In applications of this method to both narrow azimuth and wide azimuth conventional streamer data, it is observed that the receiver deghosting is fairly robust with receiver depths varying from six meters (max f=120 Hz) to fifteen meters (max f=75 Hz). It is further noted that if shots and receivers are swapped when generating mirror data the exemplary bootstrap deghosting method can also be used for shot deghosting.

Figure 9:
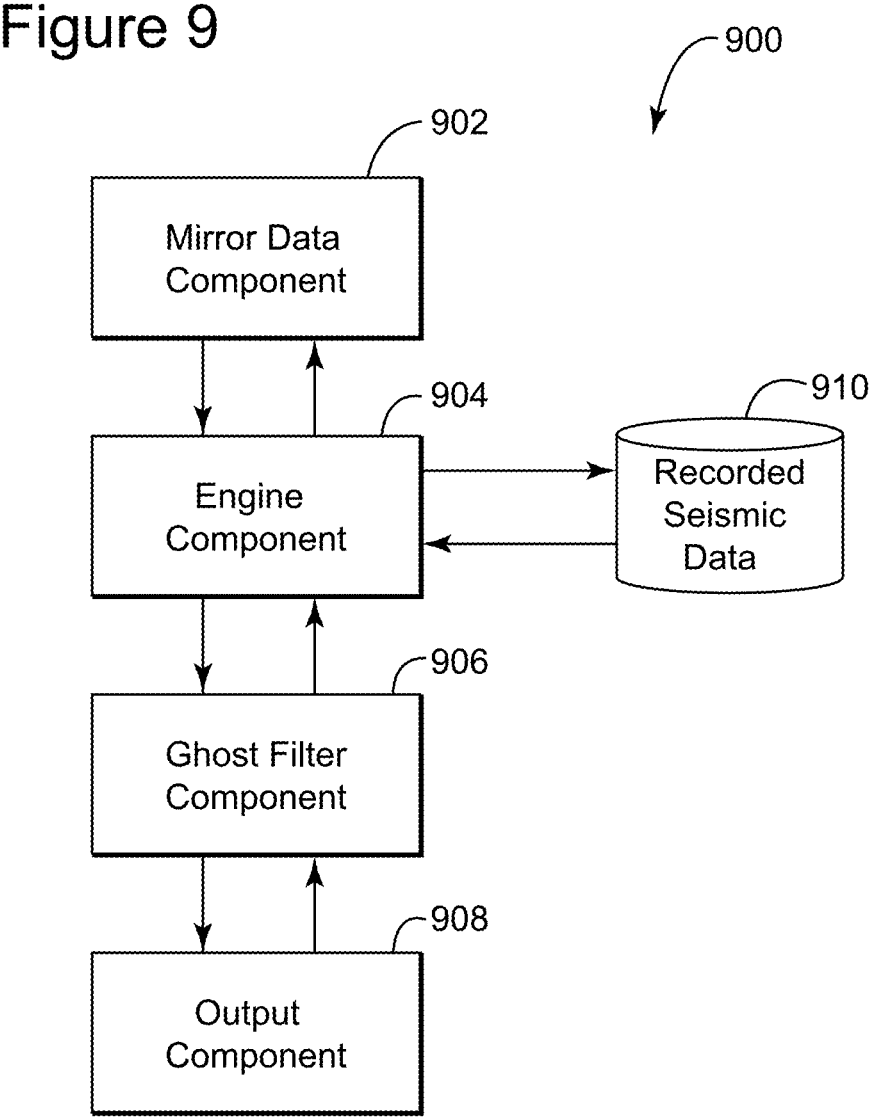
FIGS. 9-11 show various aspects of software components or modules which can be used to implement the embodiments.

As will be appreciated from the foregoing discussion, methods for generating optimized ghost filters and deghosted seismic data according to these embodiments may, at least in part, be implemented in software operating on a suitably programmed computing device. An exemplary implementation, with suitable software modules or components, will now be described with respect to FIGS. 9-11. Looking now to FIG. 9, an exemplary embodiment premigration deghosting node 900 comprises a mirror data component 902, an engine component 904, a ghost filter component 906, an output component 908 and recorded seismic data 910. The mirror data component 902 provides the capability to generate the mirror data based on the recorded seismic data 910. The mirror data is generated by using a one-dimensional ray tracing based moveout correction. It should be noted in the exemplary embodiment that this process approximately redatums the receiver ghost in the recorded data to the primary data timing, i.e., the primary in the recorded data becomes the mirror ghost which arrives earlier than the primary.

Continuing with the exemplary embodiment, the engine component 904 provides the capability to transform the recorded data and the mirror data from a time-space (T-XY) domain to a frequency-space (F-XY) domain. In another aspect, the engine component 904 generates a phase coefficient to correct for time differences between the transformed recorded data and the transformed mirror data. Next in the exemplary embodiment, the ghost filter component 906 provides the capability to generate a ghost filter based on predicting an initial ghost filter and optimizing the initial ghost filter by minimizing the ghost filter delay time associated with the transformed recorded data. Next in the exemplary embodiment, the output component 908 provides the capability to apply the optimized ghost filter to the transformed recorded data and output ghost-free receiver based seismic data.

Figure 10:
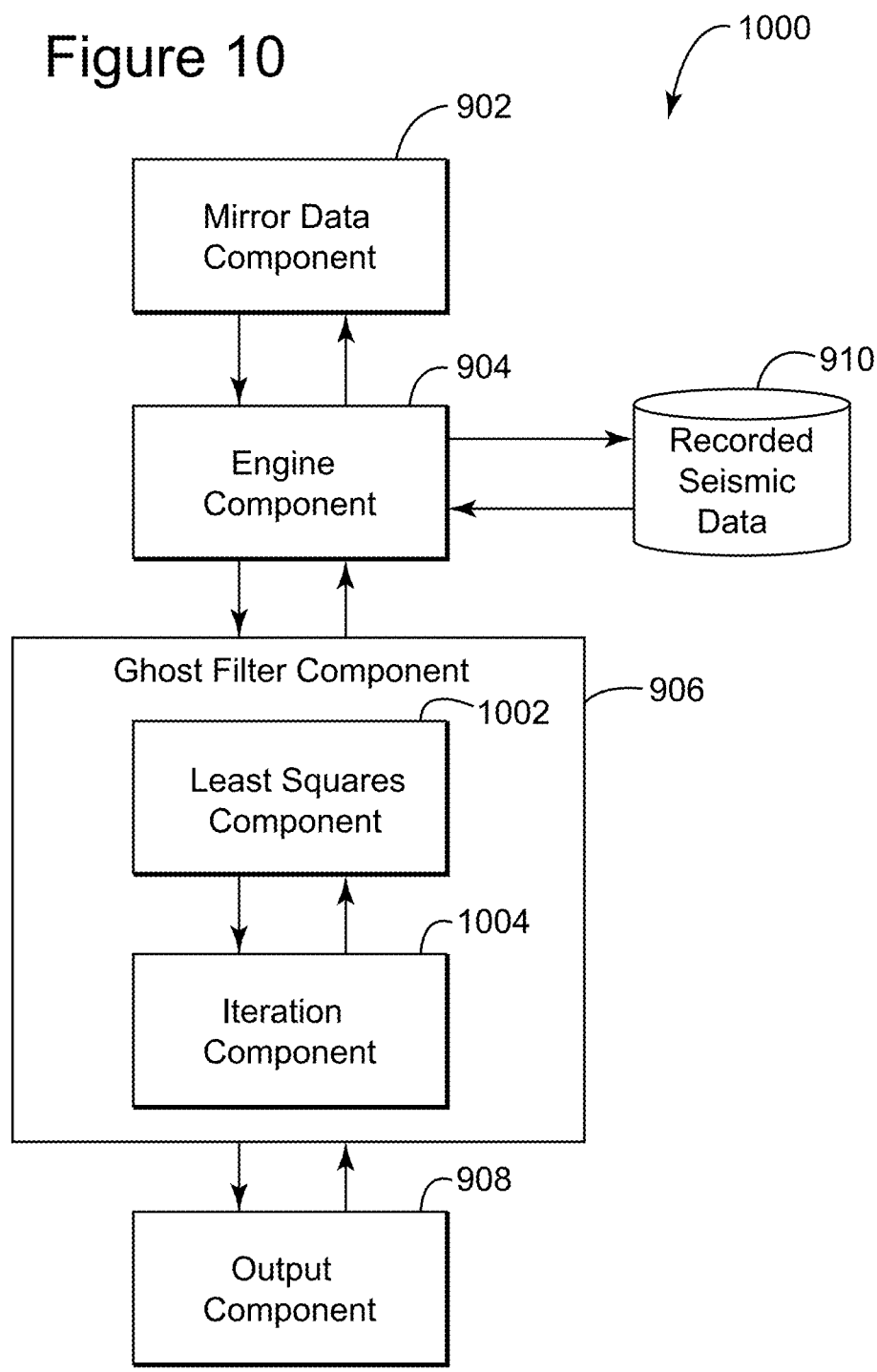

Looking now to FIG. 10, an exemplary embodiment premigration deghosting node 1000 comprises a mirror data component 902, an engine component 904, a ghost filter component 906 wherein the ghost filter component 906 further comprises a least squares component 1002 and an iteration component 1004, an output component 908 and recorded seismic data 910. The least squares component 1002 provides the ability to predict the initial ghost filter based on a least squares process and the iteration component 1004 provides the capability to optimize the predicted ghost filter by iterating through the transformed recorded data and minimizing a ghost delay time based on a difference between ghost filters associated with the different iterations.

Figure 11:
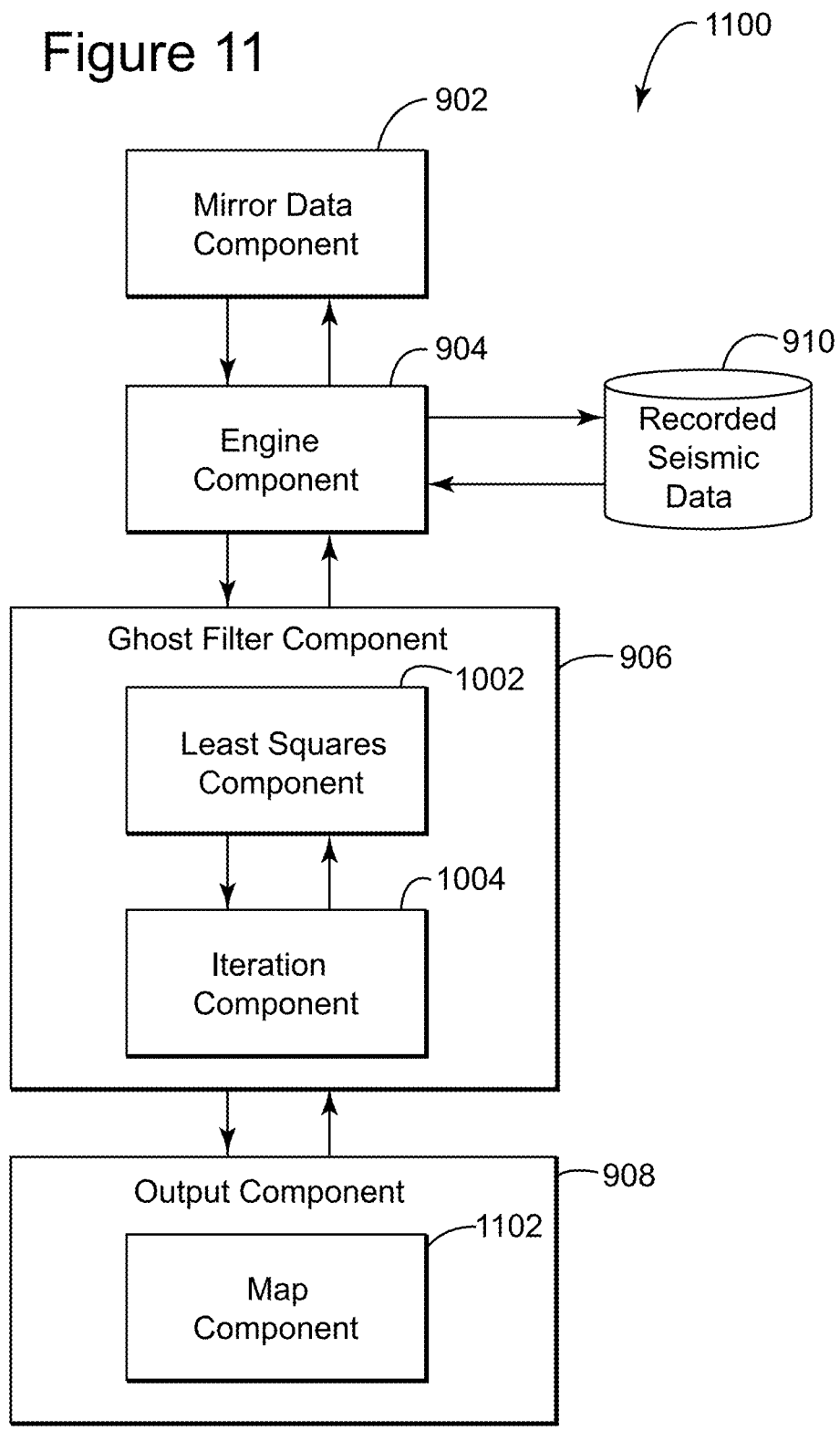

Looking now to FIG. 11 an exemplary embodiment premigration deghosting node 1100 comprises a mirror data component 902, an engine component 904, a ghost filter component 906 wherein the ghost filter component 906 further comprises a least squares component 1002 and an iteration component 1004, an output component 908 wherein the output component further comprises a map component 1102 and recorded seismic data 910. The map component 1102 provides the capability to generate a map of seismic illumination based on the ghost-free receiver-based seismic data generated by applying the optimized ghost filter to the transformed recorded data.

Looking now to FIG. 12, an exemplary method embodiment of an optimized receiver-based ghost filter generation technique 1200 is depicted. Starting at step 1202 of the exemplary method embodiment, mirror data is generated based on recorded data. In one aspect of the exemplary method embodiment step 1202, the mirror data is generated during a premigration stage. It should be noted that exemplary step 1202 can include a one-dimensional ray-tracing technique for generating the mirror data. It should further be noted that the mirror data generation can be associated with a moveout correction.

Next, at step 1204 of the exemplary method embodiment, the recorded data and the mirror data are transformed from a time-space domain to a frequency-space domain. Continuing at step 1206 of the exemplary method embodiment, a phase coefficient is added to correct for the timing differences between the transformed recorded data and the transformed mirror data.

Next at step 1208 of the exemplary method embodiment, an initial ghost filter is generated by jointly inverting the transformed recorded data and the transformed mirror data. It should be noted in exemplary step 1208 that the initial ghost filter generation is accomplished with a least squares technique.

Continuing at step 1210 of the exemplary method embodiment, the ghost filter is optimized by iterating through the transformed recorded data and minimizing a ghost delay time. It should be noted in exemplary step 1210 that the ghost delay time is based on a difference between a ghost filter associated with a previous iteration and a ghost filter associated with a current iteration. It should further be noted in exemplary step 1210 that the current iteration and the previous iteration are sequential.

The computing device(s) or other network nodes involved in optimized receiver-based ghost filter generation as set forth in the above described embodiments may be any type of computing device capable of processing and communicating seismic data associated with a seismic survey. An example of a representative computing system capable of carrying out operations in accordance with these embodiments is illustrated in FIG. 13. System 1200 includes, among other items, server 201, source/receiver interface 1202, internal data/communications bus (bus) 204, processor(s) 208 (those of ordinary skill in the art can appreciate that in modern server systems, parallel processing is becoming increasingly prevalent, and whereas a single processor would have been used in the past to implement many or at least several functions, it is more common currently to have a single dedicated processor for certain functions (e.g., digital signal processors) and therefore could be several processors, acting in serial and/or parallel, as required by the specific application), universal serial bus (USB) port 210, compact disk (CD)/digital video disk (DVD) read/write (R/W) drive 212, floppy diskette drive 214 (though less used currently, many servers still include this device), and data storage unit 232.

Data storage unit 232 itself can comprise hard disk drive (HDD) 216 (these can include conventional magnetic storage media, but, as is becoming increasingly more prevalent, can include flash drive-type mass storage devices 224, among other types), ROM device(s) 218 (these can include electrically erasable (EE) programmable ROM (EEPROM) devices, ultra-violet erasable PROM devices (UVPROMs), among other types), and random access memory (RAM) devices 220. Usable with USB port 210 is flash drive device 224, and usable with CD/DVD RAN device 212 are CD/DVD disks 234 (which can be both read and write-able). Usable with diskette drive device 214 are floppy diskettes 237. Each of the memory storage devices, or the memory storage media (216, 218, 220, 224, 234, and 237, among other types), can contain parts or components, or in its entirety, executable software programming code (software) 236 that can implement part or all of the portions of the method described herein. Further, processor 208 itself can contain one or different types of memory storage devices (most probably, but not in a limiting manner, RAM memory storage media 220) that can store all or some of the components of software 236.

In addition to the above described components, system 200 also comprises user console 234, which can include keyboard 228, display 226, and mouse 230. All of these components are known to those of ordinary skill in the art, and this description includes all known and future variants of these types of devices. Display 226 can be any type of known display or presentation screen, such as liquid crystal displays (LCDs), light emitting diode displays (LEDs), plasma displays, cathode ray tubes (CRTs), among others. User console 235 can include one or more user interface mechanisms such as a mouse, keyboard, microphone, touch pad, touch screen, voice-recognition system, among other inter-active inter-communicative devices.

User console 234, and its components if separately provided, interface with server 201 via server input/output (I/O) interface 222, which can be an RS232, Ethernet, USB or other type of communications port, or can include all or some of these, and further includes any other type of communications means, presently known or further developed. System 200 can further include communications satellite/global positioning system (GPS) transceiver device 238, to which is electrically connected at least one antenna 240 (according to an exemplary embodiment, there would be at least one GPS receive-only antenna, and at least one separate satellite bi-directional communications antenna). System 200 can access internet 242, either through a hard wired connection, via I/O interface 222 directly, or wirelessly via antenna 240, and transceiver 238.

Server 201 can be coupled to other computing devices, such as those that operate or control the equipment of ship 2, via one or more networks. Server 201 may be part of a larger network configuration as in a global area network (GAN) (e.g., internet 242), which ultimately allows connection to various landlines.

According to a further exemplary embodiment, system 200, being designed for use in seismic exploration, will interface with one or more sources 4a,b and one or more receivers 14. These, as previously described, are attached to streamers 6a,b, to which are also attached birds 13a,b that are useful to maintain positioning. As further previously discussed, sources 4 and receivers 14 can communicate with server 201 either through an electrical cable that is part of streamer 6, or via a wireless system that can communicate via antenna 240 and transceiver 238 (collectively described as communications conduit 246).

According to further exemplary embodiments, user console 235 provides a means for personnel to enter commands and configuration into system 200 (e.g., via a keyboard, buttons, switches, touch screen and/or joy stick). Display device 226 can be used to show: streamer 6 position; visual representations of acquired data; source 4 and receiver 14 status information; survey information; and other information important to the seismic data acquisition process. Source and receiver interface unit 202 can receive the hydrophone seismic data from receiver 14 though streamer communication conduit 248 (discussed above) that can be part of streamer 6, as well as streamer 6 position information from birds 13; the link is bi-directional so that commands can also be sent to birds 13 to maintain proper streamer positioning. Source and receiver interface unit 202 can also communicate bi-directionally with sources 4 through the streamer communication conduit 248 that can be part of streamer 6. Excitation signals, control signals, output signals and status information related to source 4 can be exchanged by streamer communication conduit 248 between system 200 and source 4.

Bus 204 allows a data pathway for items such as: the transfer and storage of data that originate from either the source sensors or streamer receivers; for processor 208 to access stored data contained in data storage unit memory 232; for processor 208 to send information for visual display to display 226; or for the user to send commands to system operating programs/software 236 that might reside in either the processor 208 or the source and receiver interface unit 202.

System 200 can be used to implement the methods described above associated with optimized receiver-based ghost filter generation according to an exemplary embodiment. Hardware, firmware, software or a combination thereof may be used to perform the various steps and operations described herein. According to an exemplary embodiment, software 236 for carrying out the above discussed steps can be stored and distributed on multi-media storage devices such as devices 216, 218, 220, 224, 234, and/or 237 (described above) or other form of media capable of portably storing information (e.g., universal serial bus (USB) flash drive 426). These storage media may be inserted into, and read by, devices such as the CD-ROM drive 414, the disk drive 412, among other types of software storage devices.

It should be noted in the embodiments described herein that these techniques can be applied in either an "offline", e.g., at a land-based data processing center or an "online" manner, i.e., in near real time while onboard the seismic vessel. For example, optimized receiver-based ghost filter generation can occur as the seismic data is recorded onboard the seismic vessel. In this case, it is possible for receiver-based ghost-free data to be generated as a measure of the quality of the sampling run.

The disclosed exemplary embodiments provide a server node, and a method for generating an optimized receiver-based ghost filter associated with seismic data. It should be understood that this description is not intended to limit the invention. On the contrary, the exemplary embodiments are intended to cover alternatives, modifications and equivalents, which are included in the spirit and scope of the invention. Further, in the detailed description of the exemplary embodiments, numerous specific details are set forth in order to provide a comprehensive understanding of the invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein. The methods or flow charts provided in the present application may be implemented in a computer program, software, or firmware tangibly embodied in a computer-readable storage medium for execution by a general purpose computer or a processor.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A method, stored in a memory and executing on a processor, for generating a receiver-based ghost filter from recorded data, said method comprising:
    generating mirror data from said recorded data;
    transforming said recorded data and said mirror data from a time-space domain to a frequency-space domain;
    adding a phase coefficient to a mirror ghost filter so that the mirror ghost filter is time aligned with a ghost filter, wherein the transformed recorded data is expressed by multiplying initial primary receiver ghost-free data with the ghost filter and the transformed mirror data is expressed by multiplying the initial primary receiver ghost-free data with the mirror ghost filter;
    generating an initial ghost as a difference between the transformed recorded data and the initial primary receiver ghost-free data, wherein the initial primary receiver ghost-free data is calculated by jointly solving (i) a first equation that relates the transformed recorded data, the initial primary receiver ghost-free data and the ghost filter, and (ii) a second equation that relates the transformed mirror data, the initial primary receiver ghost-free data and the mirror ghost filter;
    generating said ghost filter by iterating through said transformed recorded data from which the initial primary receiver ghost-free data is subtracted and minimizing a sum of the initial primary receiver ghost-free data and the initial ghost multiplied by the phase coefficient to obtain a ghost delay time;
    calculating a final primary receiver ghost-free data associated with a current iteration based on the transformed recorded data and the ghost filter; and generating an image of a geophysical structure underground based on the final primary receiver ghost-free data.

2. The method of claim 1, wherein said generating mirror data is based on a one-dimensional ray-tracing technique.

3. The method of claim 2, wherein said one-dimensional ray tracing technique is associated with a moveout correction.

4. The method of claim 1, further comprising generating the final primary receiver ghost-free seismic data based on applying said ghost filter to said recorded data.

5. The method of claim 4, wherein said applying further comprises inverting said ghost filter before application.

6. The method of claim 1, wherein said phase coefficient matches timing differences between said transformed recorded data and said transformed mirror data.

7. The method of claim 6, wherein said timing differences are based on redatuming associated with said one-dimensional ray-tracing technique.

8. The method of claim 6, wherein said timing differences are based on velocity inaccuracy.

9. The method of claim 6, wherein said timing differences are based on receiver depth inaccuracy.

10. The method of claim 1, wherein associated events of said time-space domain have a similar ghost delay time.

11. The method of claim 10, wherein said similar ghost delay time is less than an inverse of four times the maximum frequency of said recorded data.

12. The method of claim 1, wherein said recorded data has a constant depth profile.

13. The method of claim 1, wherein said recorded data has a variable depth profile.

14. The method of claim 1, wherein said recorded data is two-dimensional data.

15. The method of claim 1, wherein said recorded data is three-dimensional data.

16. A node for generating ghost-free receiver-based seismic data, said node comprising:
recorded seismic data;
one or more processors configured to execute computer instructions and a memory configured to store said computer instructions wherein said computer instructions further comprise:
generating mirror data of said recorded data;
transforming said recorded data and said mirror data from a space-time domain to a frequency-time domain and adding a phase coefficient to a mirror ghost filter so that the mirror ghost filter is time aligned with a ghost filter, wherein the transformed recorded data is expressed by multiplying initial primary receiver ghost-free data with the ghost filter and the transformed mirror data is expressed by multiplying the initial primary receiver ghost-free data with the mirror ghost filter;
generating an initial ghost as a difference between the transformed recorded data and the initial primary receiver ghost-free data, wherein the initial primary receiver ghost-free data is calculated by jointly solving (i) a first equation that relates the transformed recorded data, the initial primary receiver ghost-free data and the ghost filter, and (ii) a second equation that relates the transformed mirror data, the initial primary receiver ghost-free data and the mirror ghost filter;
applying said final ghost filter to said transformed recorded data and outputting final primary receiver ghost-free data associated with a current iteration; and
generating an image of a geophysical structure underground based on the final primary receiver ghost-free seismic data.

17. The node of claim 16, wherein said one or more processors are configured to apply a least squares method for calculating the initial primary receiver ghost-free data.

18. The node of claim 16, wherein the one or more processors are configured for generating a map of seismic illumination based on said final primary receiver ghost-free seismic data.

* * * * *